US007992792B2

United States Patent
Van Rensburg

(10) Patent No.: US 7,992,792 B2
(45) Date of Patent: Aug. 9, 2011

(54) PORTABLE PAYMENT DEVICE

(75) Inventor: Johannes Janse Van Rensburg, Stellenbosch (ZA)

(73) Assignee: FUNDAMO (Proprietary) Limited, Cape Town (ZA)

( * ) Notice: Subject to any disclaimer, the term of this patent is extended or adjusted under 35 U.S.C. 154(b) by 0 days.

(21) Appl. No.: 12/448,454

(22) PCT Filed: Aug. 23, 2007

(86) PCT No.: PCT/IB2007/002415
§ 371 (c)(1),
(2), (4) Date: Jan. 6, 2010

(87) PCT Pub. No.: WO2008/075143
PCT Pub. Date: Jun. 26, 2008

(65) Prior Publication Data
US 2010/0133337 A1    Jun. 3, 2010

(30) Foreign Application Priority Data
Dec. 18, 2006 (ZA) ................. 2006/10619

(51) Int. Cl.
*G06K 19/06* (2006.01)
*G06K 5/00* (2006.01)
*G07F 19/00* (2006.01)
*G06F 7/08* (2006.01)
*G06Q 20/00* (2006.01)
*G06Q 40/00* (2006.01)

(52) U.S. Cl. ........ 235/492; 235/379; 235/380; 235/381; 705/16; 705/17; 705/39; 705/41

(58) Field of Classification Search ............ 235/379, 235/380, 381, 492; 705/16, 17, 39, 41
See application file for complete search history.

(56) References Cited

U.S. PATENT DOCUMENTS

| 7,328,850 | B2* | 2/2008 | Sines ........................... 235/492 |
| 7,657,486 | B2* | 2/2010 | Smets et al. .................... 705/41 |
| 2002/0002534 | A1* | 1/2002 | Davis et al. ..................... 705/39 |
| 2004/0230535 | A1* | 11/2004 | Binder et al. .................... 705/64 |
| 2005/0250538 | A1* | 11/2005 | Narasimhan et al. ........ 455/558 |
| 2006/0261174 | A1* | 11/2006 | Zellner et al. ................. 235/492 |
| 2009/0239512 | A1* | 9/2009 | Hammad et al. ........... 455/414.1 |

FOREIGN PATENT DOCUMENTS

| GB | 2 317 484 A | 3/1998 |
| WO | WO9302430 A2 | 2/1993 |
| WO | WO0177931 | 10/2001 |
| WO | WO2005/027035 | 3/2005 |

* cited by examiner

Primary Examiner — Thien M. Le
Assistant Examiner — April Taylor
(74) Attorney, Agent, or Firm — Ballard Spahr LLP

(57) ABSTRACT

A payment method and system are provided for electronic data that is purchased by a recipient from a supplier thereof for transmission to the recipient with payment being made in advance of downloading of the electronic data. The pre-payment entitles the recipient to a predetermined period of time online, or a predetermined quantity of downloaded electronic data. Payment control means associated with communication means communicates with a source of funding associated with the particular recipient and an allocated funds register is associated with the source of funding such that an initial quantum of value contained in the source of funding is credited to the allocated funds register. The payment control means monitors the balance remaining in the allocated funds register and when a predetermined low value is reached a further predetermined quantum of value contained in the source of funding is credited to the allocated funds register to increase the balance therein and enable continued connectivity.

9 Claims, 3 Drawing Sheets

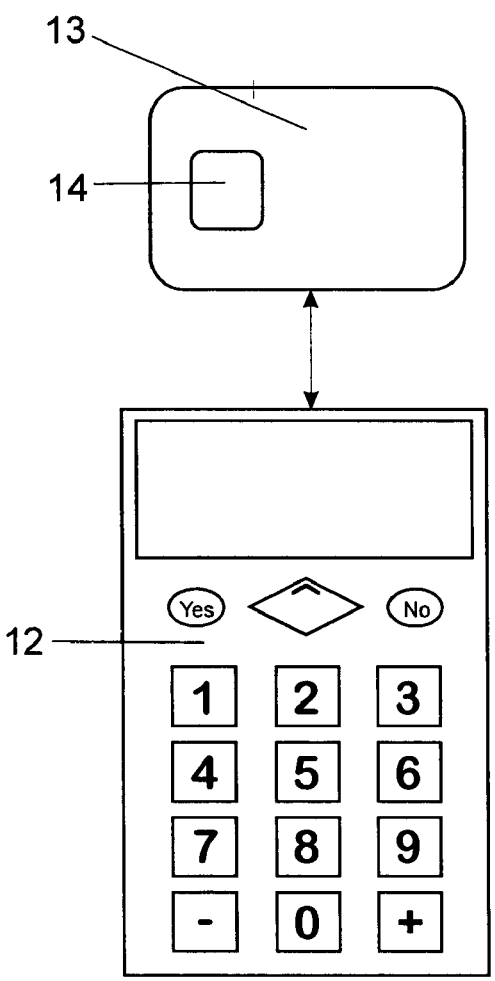
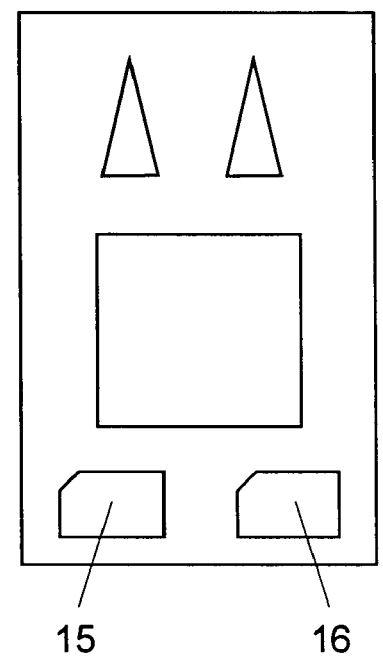
Figure 5                    Figure 6

US 7,992,792 B2

PORTABLE PAYMENT DEVICE

CROSS REFERENCE TO RELATED APPLICATIONS

The present application is a National Phase Application of International Application No. PCT/IB2007/002415 filed Aug. 23, 2007, which claims priority to South African Patent Application No. 2006/10619, filed Dec. 18, 2006, which applications are incorporated herein fully by this reference.

FIELD OF THE INVENTION

This invention relates to a portable payment device, typically a pocket sized payment device, whereby cashless payments of a wide variety of different types, both big and small, can be made, either on-line with a bank or other financial institution, or off-line.

BACKGROUND TO THE INVENTION

Electronic payments that the average person generally makes fall into two different categories that will be herein referred to as proximity payments being of the nature where the recipient is generally present, and remote payments in which the recipient is generally not present and a financial account of the recipient is credited by the remote activation of a suitable communications device.

As regards proximity payments, there have been numerous different proposals and implementations of systems aimed at substantially diminishing the use of hard cash in every-day transactions, particularly, but by no means exclusively, transactions of small or everyday money value, with a view to improving convenience, safety and security and particularly with a view to avoiding the necessity of persons carrying appreciable amounts of hard cash on their person.

Many of these systems involve the use of a smartcard or equivalent electronic memory embodied in a dedicated physical entity (herein referred to as a smartcard irrespective of its actual physical form), often referred to in the industry as an electronic purse or wallet, in which a positive cash balance is retained in an electronic memory for utilization by transferring amounts from time to time to a similar smart card of another person, or to a supplier of goods or services, by interaction of a device with the smartcard or smartcards. This is typically done by inserting the smartcard into a smartcard reader or by making use of a contactless coupling (also referred to as near field communication or NFC).

Smartcards do provide an effective means of storing financial information of a user as well as providing a very high level of security. Unfortunately, one of the serious disadvantages of a smartcard based payment system is the cost and logistical difficulties of making smartcard acquisition and operating infrastructure available. Only if sufficiently wide access to the necessary infrastructure is made available to enable interaction with smartcards is it possible to offer a workable payment system. This has not, as far as applicant is aware, proved to be the case, apparently because of the costs and logistics involved. Also, smartcard systems, as far as applicant is aware, do not provide an adequate record for purposes of comprehensive reconciliation of an account.

As regards remote payments, one solution that has been deployed is to attach a smartcard reader to a personal computer to enable the user to derive some of the benefits of smartcards in interacting with a remote payment system over the Internet, for example.

Many other payment systems that are not based on smartcards have been deployed in which mobile telephones (typically based on SIM cards) are used to access a remote payment system via the mobile telephone network. Even though they do provide appreciable utility, these payment systems suffer from the disadvantage that they do not cater adequately for proximity payments in the manner of a smartcard, as all transactions, large or small, and whether the payment is a proximity or remote payment, need to be routed via the mobile telephone network. Also, off-line payments that may be required from time to time, are not available in the event that the mobile telephone network is unavailable by virtue of fault or unavailability in a particular geographical location.

Accordingly, the payment systems proposed and employed to date are quite expensive to implement in that they require the use of expensive equipment such as smartcard interaction devices, mobile telephones, personal computers, and other costly infrastructure and they also do not satisfy all requirements for both remote and proximity payments.

OBJECT OF THE INVENTION

It is an object of this invention to provide a portable payment device that overcomes, at least to some extent, one or more of the disadvantages of the systems outlined above.

SUMMARY OF THE INVENTION

In accordance with this invention there is provided a portable payment device comprising a casing having a microprocessor and memory means therein with the memory means being configured to include an electronic purse for the retention of value that is operatively available to be decremented in off-line transactions, coupling means for coupling the microprocessor to a cooperant device to enable the transfer of value from or to the electronic purse to carry out proximity payments, and user interface means for enabling a user to input instruction data into the portable payment device, the portable payment device being characterised in that it has, in addition, wireless communications means configured for the conduct of remote payments by way of a wireless network by communication with a financial institution.

Further features of the invention provide for the coupling means to be contactless coupling means, typically near field communication or NFC; for the wireless communications means to be dedicated transaction data communications means; for the portable payment device to be a dedicated payment device (that is serving no other purpose); for the user interface means to include a keypad and display panel; for the microprocessor and memory to be configured to retain data relating to off-line transactions conducted in which instance the system is such that retained data is uploaded to an associated financial institution when later communicating therewith; and for the portable payment device to have its own battery power supply embodied therein.

The microprocessor and memory means may be constituted, at least in part and optionally totally, by a smartcard operatively received by the casing to form the portable payment device but that is preferably removable therefrom for purposes of storage, surrender to an issuing banking institution, and inventory control. As a further alternative, a suitable SIM card could be employed preferably independently of any SIM card used for communications with a banking institution.

Of course, the portable payment device defined above may be built using standard protocols and interfaces, and may embody standard or any other security features such as encryption of data typically using encryption and decryption keys and the provision of suitable identification of an operator such as by use of a pin number (personal identification number) or biometric data. The portable payment device of the invention, however, in contradistinction to prior art payment devices, will allow an extended range of payment features that is not currently available in any one device.

In order that the above and other features of the invention may be more fully understood, an extended description thereof will now follow with reference to the accompanying drawings.

BRIEF DESCRIPTION OF THE DRAWINGS

In the drawings:—

FIG. 5 is a schematic view similar to FIG. 1 but illustrating an embodiment in which a smartcard forms part of the portable payment device; and, FIG. 6 is a schematic view similar to FIG. 2 but illustrating an embodiment in which an additional SIM card forms part of the portable payment device.

DETAILED DESCRIPTION WITH REFERENCE TO THE DRAWINGS

Figure 1:
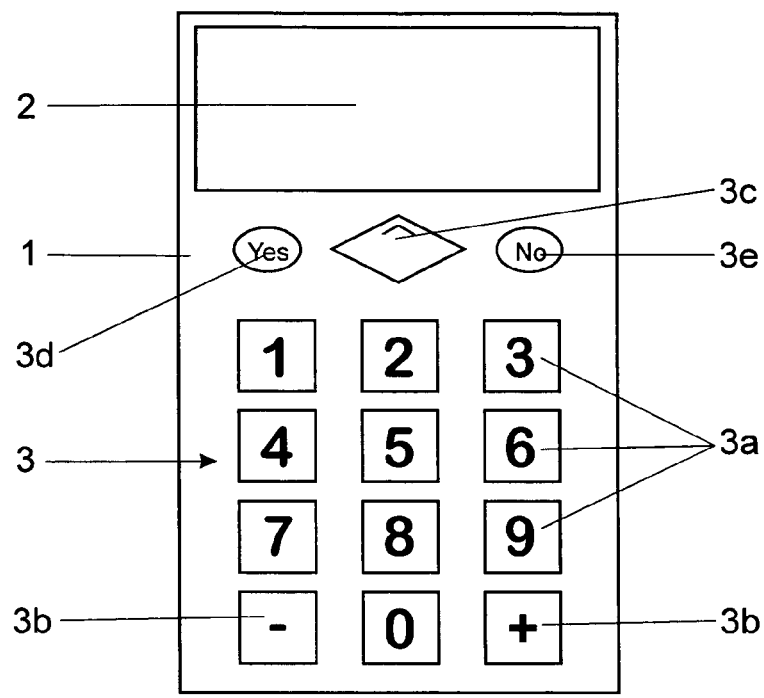
FIG. 1 is a schematic front elevation of one embodiment of portable payment device according to the invention.
Figure 2:
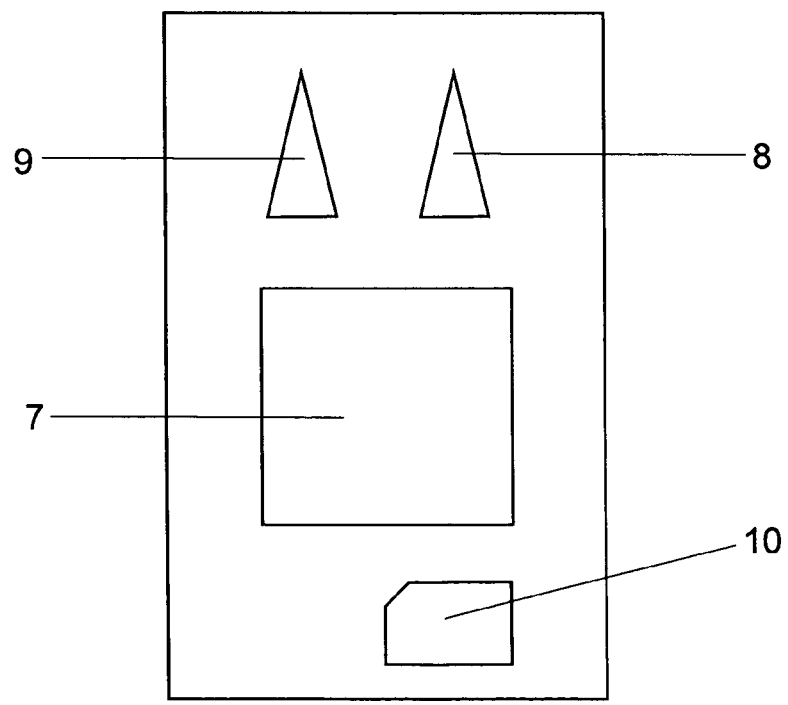
FIG. 2 is a schematic rear elevation thereof.
Figure 3:
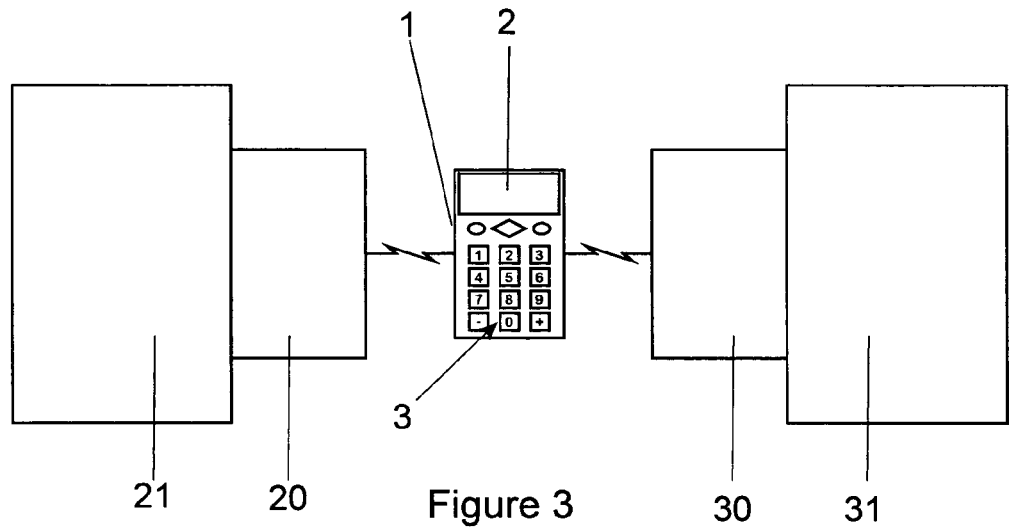
FIG. 3 illustrates schematically the interaction between the portable payment device and alternate proximity and remote payment vehicles.
Figure 4:
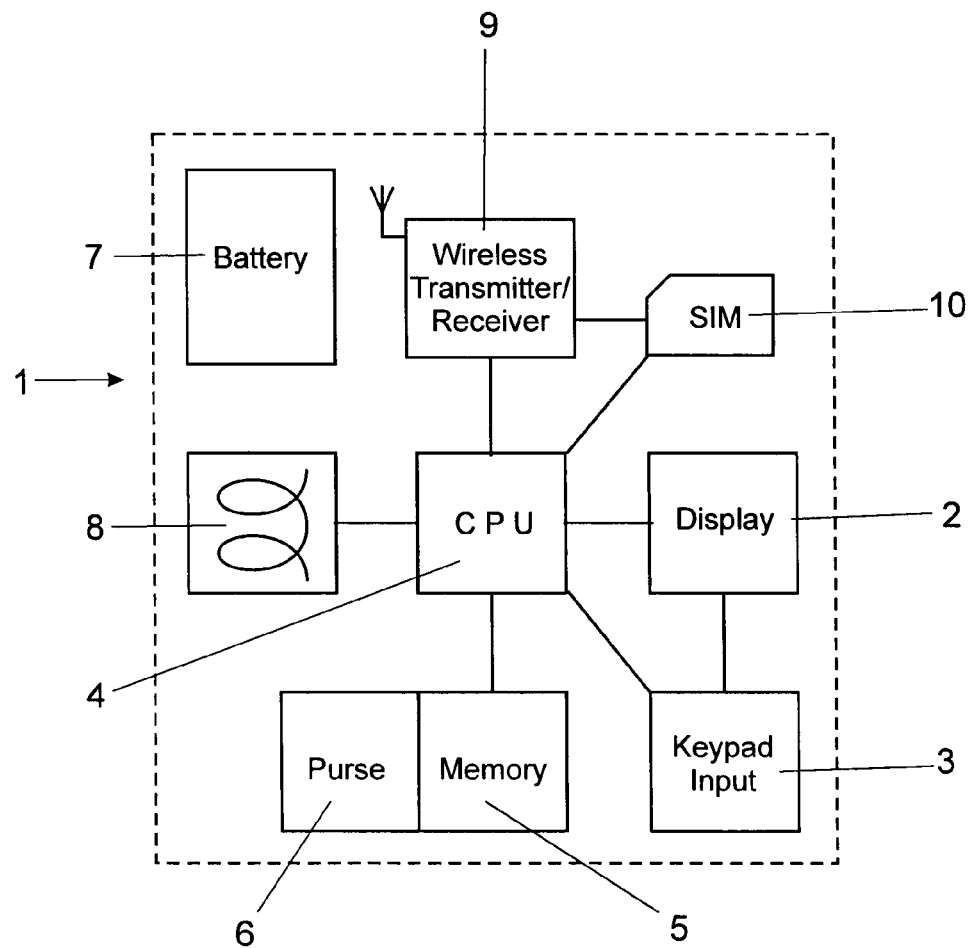
FIG. 4 is a schematic block diagram of the circuit of the portable payment device.

In this embodiment of the invention the portable payment device is made as a dedicated pocket-sized unit in its own casing (1) and devoid of any facilities other than those relating to the conduct of financial transactions, being both receipts and payments. With modern electronic circuits it is envisaged that the portable payment device may be made to a conveniently small size that can be easily stowed for transport and storage purposes, possibly even in a wallet, or the like.

In this format the payment device can be controlled and issued by or on behalf of an associated banking institution rather than the situation where the network operator owns the device, as in existing mobile phone banking solutions, and wherein the bank needs to negotiate space on the network device. It will also be possible to deploy higher levels of security, because of the issue and management of transactional keys that will be more in line to those currently employed by banks.

In this embodiment of the invention the portable payment device has, on its front face, a display screen (2) and keypad (3) forming a user interface. It is envisaged that a rather simple keypad can be provided in which keys (3a) are provided that correspond to the necessary numerals; keys (3b) are provided that correspond to addition and subtraction; one or more keys (3c) are provided that are navigational keys for selecting items from a displayed menu; and keys are provided that correspond to accept (3d) and reject (3e) keys.

The electronic circuitry of the payment device includes a microprocessor or CPU (4); a memory module (5) having capacity and an area dedicated to serve as an electronic purse (6) for retaining value in the manner of a smartcard; and a battery (7).

For purposes of communicating with suitable cooperant devices in the conduct of proximity transactions, there is provided contactless coupling means (8), generally in the form of a smartcard coupling circuit such as a near field communication or NFC arrangement, whereby the circuit of the payment device can be coupled to a cooperant device (20), optionally one operating within an existing smartcard system (21). The cooperant device may be another identical portable payment device or a conventional smartcard type of device. This arrangement is such that off-line transactions can be conducted utilising available value contained in the electronic purse. The programming of the microprocessor and memory means is such that data relating to off-line transactions is retained until it is uploaded to the data base of an associated banking institution generally on the next occasion of establishing communication with the banking institution.

For purposes of communicating directly with an associated banking institution (30) via a GSM network (31), and conducting remote transactions very much in the manner of that conducted in existing mobile phone banking systems, there is provided a wireless transmitter/receiver (9) and an associated SIM card (10). Of course, for the conduct of transactions of this nature, the wireless communications need only to be data enabled thereby maintaining simplicity and minimising cost.

Typically, the microprocessor will be programmed to present a menu of available transactions that can be conducted and from which a suitable selection can be made. Such items may include local financial transactions; international financial transactions; queries and authorization requests. The local transactions may be divided into transactions between portable payment devices of the nature provided by this invention; transactions with merchants or other repeat transactions with particular recipients that may be either on-line (remote payments) or off-line (typically proximity payments); once-off transactions that may be either on-line or off-line; and transactions with a participating banking institution. It is to be noted that one of the remote transactions that will inevitably be provided as a special menu item will be the transfer of additional value to the electronic purse, as and when required, from the user's account at the banking institution.

Without being exhaustive, the arrangement described above can be configured so as to enable many new versions of transactions not currently possible with either smartcard systems or mobile payment systems. These include the ability to check the content of the smartcard without the need to visit a smartcard reader; the ability to replenish the electronic purse with value without the need to visit a smartcard reader; the ability to reconcile off-line transactions with on-line transactions in a simple manner; the ability to keep an audit log of transactions in the device for online transactions; the ability to disable a payment device that has been lost without waiting for it to dock; and the ability to change applications on the device wirelessly by communicating with the financial institution.

A user will thus be able to see the balance remaining in the off-line electronic purse before committing to any activity such as purchasing parking at a proximity parking meter. Immediately a user realises that insufficient credit is present in the electronic purse, with a few key-strokes on the payment device, additional credit can be loaded from an associated banking account via the GSM network, provided of course that credit is available in the banking account.

It will be understood that all off-line transactions may be stored in the memory of the device and, when connecting to the bank via the GSM wireless network subsequently, all of these transactions may be automatically uploaded to the bank's data base to ensure continuous reconciliation.

In consequence of the fact that, using the payment devices of this invention, the bank can have real-time access to payment devices and can scan all on-line devices to check the version of software in use, the balance in the off-line purse, and find missing transactions. The bank is also able to remotely disable a payment device without the device being near any bank infrastructure.

The payment device of this invention thus allows for both remote payment transactions (on-line transactions) in a manner similar to those presently capable of being achieved utilising mobile telephone banking as well as proximity or off-line payments. The combination of the features of smartcard systems and mobile telephone banking systems has a synergistic effect in that numerous transactions that could not be conducted by either of these systems on their own can be carried out utilising the payment devices of this invention.

The payment device of this invention will further employ the same high levels of payment security inherent in smartcard based payments, but will not require the same degree of investment to deploy a viable payment network.

The embodiment of the invention is described as a unitary device produced in its entirety as such. It is, however, also possible that, as indicated in FIG. 5, the device could be constituted by what in effect is a portable docking station contained in the casing (12) with a removable commercially available or dedicated smartcard (13) having a microprocessor and memory means collectively indicated by numeral (14). It is envisaged that banking institutions may find such an arrangement particularly advantageous in that the relevant transaction keys (encryption keys) would be retained on the smartcard and provide an issuing banking institution with a facility for simplified and effective control over the smartcard.

As a further alternative, and as indicated in FIG. 6, the microprocessor and memory means could be embodied, at least in part, in a suitable SIM card (15) that would be in addition to the communications SIM card (16).

Numerous other variations are possible within scope of the invention.

The invention claimed is:

1. A portable payment device comprising a casing having a microprocessor and memory means therein with the memory means being configured to include an electronic purse for the retention of value that is operatively available to be decremented in off-line transactions,
   coupling means for coupling the microprocessor to a cooperant device to enable the transfer of value from or to the electronic purse to carry out one category of payments in the form of off-line proximity payments,
   user interface means for enabling a user to input instruction data into the portable payment device,
   wireless communications means for communicating with a financial institution by way of a wireless communications network,
   wherein the portable payment device is configured for the conduct of an additional and different category of payments in the form of remote on-line payments by way of the wireless communications network by communication with the financial institution
   wherein the said different category of remote on-line payments enable a payment to be made from an account of the user controlled by the financial institution to a financial account of a recipient.

2. A portable payment device as claimed in claim 1 in which the coupling means are contactless coupling means.

3. A portable payment device as claimed in claim 1 in which the wireless communications means are dedicated transaction data communications means.

4. A portable payment device as claimed in claim 1 in which the portable payment device is a dedicated payment device.

5. A portable payment device as claimed in claim 1 in which the user interface means includes a keypad and display panel.

6. A portable payment device as claimed in claim 1 in which the microprocessor and memory are configured to retain data relating to off-line transactions conducted in which instance the system is such that retained data is uploaded to an associated financial institution when later communicating therewith by way of the wireless network.

7. A portable payment device as claimed in claim 1 in which the portable payment device is a unitary device produced in its entirety as such.

8. A portable payment device as claimed in claim 1 in which the microprocessor and memory means are constituted, at least in part, by a smartcard operatively received by the casing to form the portable payment device.

9. A portable payment device as claimed in claim 1 in which the microprocessor and memory means are constituted, at least in part, by a SIM card employed independently of any SIM card that is used for communications with a banking institution.

* * * * *

UNITED STATES PATENT AND TRADEMARK OFFICE
CERTIFICATE OF CORRECTION

| | | |
|---|---|---|
| PATENT NO. | : 7,992,792 B2 | Page 1 of 1 |
| APPLICATION NO. | : 12/448454 | |
| DATED | : August 9, 2011 | |
| INVENTOR(S) | : Johannes Janse Van Rensburg | |

It is certified that error appears in the above-identified patent and that said Letters Patent is hereby corrected as shown below:

Title Page
The Abstract (Item 57) is deleted and replaced by the following:

--ABSTRACT
A portable payment device is provided comprising a casing having a microprocessor and memory means therein with the memory means being configured to include an electronic purse for the retention of value that is operatively available to be decremented in off-line transactions. Coupling means enable coupling of the microprocessor with a cooperant device to enable the transfer of value from or to the electronic purse to carry out proximity payments. A user interface means typically in the form of a keypad and display are provided for enabling a user to input instruction data into the portable payment device. The portable payment device has, in addition, wireless communications means configured for the conduct of remote payments by way of a wireless network by communication with a financial institution.--

Signed and Sealed this
Tenth Day of April, 2012

David J. Kappos
*Director of the United States Patent and Trademark Office*